United States Patent [19]
Ambler et al.

[11] Patent Number: 5,304,615
[45] Date of Patent: Apr. 19, 1994

[54] PREPARATION OF BUTENE POLYMERS USING AN IONIC LIQUID

[75] Inventors: Philip W. Ambler, Bracknell; Philip K. G. Hodgson, Walton-on-Thames; Nevin J. Stewart, Guildford, all of England

[73] Assignee: BP Chemicals Limited, London, England

[21] Appl. No.: 13,752

[22] Filed: Feb. 4, 1993

[30] Foreign Application Priority Data

Feb. 19, 1992 [GB] United Kingdom ................ 9203515
Oct. 2, 1992 [GB] United Kingdom ................ 9220779

[51] Int. Cl.$^5$ .......................... C08F 4/52; C08F 4/12; C08F 10/08
[52] U.S. Cl. .................................... 526/189; 526/204; 526/237; 526/290; 526/348.6; 526/348.7
[58] Field of Search .............. 526/189, 204, 237, 290, 526/348.6, 348.7; 585/511, 527

[56] References Cited

FOREIGN PATENT DOCUMENTS 2611700 9/1988 France.

OTHER PUBLICATIONS

J. Chem. Soc., Chem. Communications, "Catalytic Dimerization of Alkenes by Nickel Complexes in Organochloroaluminate Molten Salts", 1990 pp. 1715-1716.
J. Org. Chem., "Friedel-Crafts Reactions in Ambient-Temperature Molten Salts", 1986, 480-483.

Primary Examiner—Fred Teskin
Attorney, Agent, or Firm—Brooks Haidt Haffner & Delahunty

[57] ABSTRACT

This invention relates to a process for the polymerization of an olefinic feedstock comprising one or more of butene-1, butene-2 and iso-butene by bringing the feedstock into contact with an ionic liquid comprising a) an aluminium compound of the formula $R_nAlX_{3-n}$ wherein R is a C1-C6 alkyl radical, X is a halogen atom and n is 0, 1 or 2, and b) a substituted imidazolium and/or a substituted pyridinium halide such that the melting point of the ionic liquid is below the reaction temperature in the range from −50° C. to +100° C. The polymers so produced can be used to react with alkenyl succinimides which are useful fuel and lubricating oil additives.

9 Claims, No Drawings

PREPARATION OF BUTENE POLYMERS USING AN IONIC LIQUID

This invention relates to a method of producing butene polymers, especially from raffinates I and II from a refining process and which contain inter alia a mixture of butene-1, butene-2 and iso-butene, using an ionic liquid as the reaction medium and catalyst.

Ionic liquids are primarily mixtures of salts which melt below room temperature. Such salt mixtures include aluminium halides in combination with one or more of imidazolium halides, pyridinium halides or phosphonium halides and the latter being preferably substituted. Examples of the latter include one or more of 1-methyl-3-butyl imidazolium halides, 1-butyl pyridinium halide and tetrabutyl phosphonium halides.

It is known to use these ionic liquids as solvents and as catalysts for the dimerization and/or oligomerization of olefins such as ethylene, propylene, butene-1 and/or butene-2 and for the alkylation of benzene using alkyl halides. In this context Jeffrey A Boon et al states in an article in the Journal of Organic Chemistry, Vol 51, 1986, pp 480-483 that:

"Completely ionic liquids are not the usual solvent for organic reactions. Most ionic liquids are liquid only at high temperatures and offer little advantage over the more commonly used aqueous or organic media. Most work on organic reactions in molten salts have employed eutectic mixtures, but they still require temperatures above 200° C."

This article further goes on to state that:

"Numerous other substituted imidazolium and pyridinium chlorides form molten salts with aluminium chloride but do not possess the favourable physical properties we sought for this investigation."

From the above, it is clear that not all ionic liquids possess the properties desirable for specific reactions in which they are to be used and that the choice of specific ionic liquids for a given reaction is far from straightforward.

A further article by Yves Chauvin et al in J Chem Soc, Chem Comm, 1990, pp 1715-1716 also emphasises this point. In this article, the authors intend to carry out catalytic dimerization of alkenes by nickel complexes in organochloroaluminate molten salts to the exclusion of all other products. Moreover, the authors state that:

"However, it seems that no attempt has been made to take advantage of the solubility of the organometallic catalyst and the insolubility of the reaction products of the catalytic reaction in these solvents."

The authors add that:

"In the absence of any nickel complex, acidic melts catalyse the formation of oligomers, the molecular weight of which is characteristic of a cationic reaction".

To further add to the unpredictability of these reactions, French Patent No. 2611700 (Institut Francais du Petrole) describes a process for the oligomerization of olefins including inter alia butene-1 and butene-2 using a nickel catalyst in the liquid phase; the catalyst used is specifically a nickel complex dissolved in an ionic liquid, the latter being the liquid phase.

None of the above documents make any mention of reaction with a feedstock comprising iso-butene.

From the above it will be clear that the function of ionic liquids in these reactions is far from predictable.

It has now been found that feedstock comprising inter alia one or more of butene-1, butene-2 and iso-butene can be polymerised using ionic liquids in the absence of additional catalysts such as nickel.

Accordingly, the present invention is a process for the polymerization of an olefinic feedstock comprising one or more of butene-1, butene-2 and iso-butene, said process comprising bringing the feedstock into contact with an ionic liquid comprising a) an aluminium compound of the formula $R_nAlX_{3-n}$ wherein R is a C1-C6 alkyl radical, X is a halogen atom and n is 0, 1 or 2, and b) a substituted imidazolium and/or a substituted pyridinium halide such that the melting point of the ionic liquid is below the reaction temperature, said reaction temperature being in the range from $-50°$ C. to $+100°$ C.

The polymerization product referred to herein is distinctly different from oligomers which are conventionally defined as "a very low molecular weight polymer in which the number of repeating units equals 2-10" (see Polymer Chemistry, An Introduction by R. B. Seymour and C. E. Carraher, 2nd Edition, 1988, p 14, and published by Marcel Dekker Inc).

In contrast, the polymers formed by the process of the present invention have at least 11 repeating units, i.e. an average molecular weight of at least 600 and can produce polymers having a molecular weight up to 100,000.

The hydrocarbon feedstock for this process is preferably a raffinate from the refining process and can be raffinate I or raffinate II.

Raffinate I is usually the butadiene raffinate which is a by product formed during the thermal or catalytic cracking (whether or not fluid) operation in a refinery and principally comprises C4 hydrocarbons especially a mixture of butene-1, butene-2 and iso-butene along with some saturated hydrocarbons. More specifically, such raffinate I comprises at least 10% w/w of iso-butene, from 20-40% w/w of butene-1 and butene-2, and from 10-20% w/w of butanes.

Raffinate II is the unpolymerised by-products recoverable when Raffinate I is subjected to polymerization using e.g. Lewis acid catalysts or the by-product gases resulting from the production of the lead-free antiknock compound, methyl tertiary butyl ether (MTBE). In both processes the by-products have substantially the same composition and are rich in n-butenes. These by-products are the so called "raffinate II" and typically contain from 30-55% w/w of butene-1, about 10% w/w of cis-butene-2, about 17% w/w of trans-butene-2, upto 6% w/w of iso-butene and upto 30% w/w of the saturated C4 hydrocarbons n-butane and iso-butane. Since raffinate II, an otherwise wasted material, is capable of being cationically polymerized to polybutenes, its value as raw material is readily apparent.

The ionic liquids that can be used comprise an aluminium compound which is suitably an aluminium halide, such as aluminium trichloride or an alkyl aluminium halide such as an alkyl aluminium dichloride and preferably ethyl aluminium dichloride. The component (b) in the ionic liquid is suitably a hydrocarbyl substituted imidazolium halide or a hydrocarbyl substituted pyridinium halide, especially the 1-alkyl-3-alkylinudazolium halides, the 1-alkyl pyridinium halides and the alkylene pyridinium dihalides. Specific examples of these compounds include the following: 1-methyl-3-ethylimidazolium chloride, 1-ethyl-3 -butylimidazolium chloride, 1 -methyl-3(butylimidazolium chloride, 1-methyl-3 -butylimidazolium bromide, 1-methyl-3 propylimidazolium chloride, ethyl pyridinium bromide, ethyl pyridinium chloride, ethylene pyridinium dibromide, ethylene pyridinium dichloride, butyl pyridinium chloride and benzyl pyridinium bromide. Of these, 1-methyl-3-ethylimidazolium chloride is preferred.

The relative ratios of the two components (a) and (b) in the ionic liquid should be such that they are capable of remaining in the liquid state under the reaction conditions. Typically, the relative mole ratio of aluminium compound to the component (b) in the ionic liquid is suitably in the range from 1:1 to 2:1, preferably from 1.5:1 to 2:1.

The polymerization reaction is suitably carried out at a temperature from −300° C. to +700° C., preferably from −25° C. to +60° C. The reaction can be carried out either:
(i) by bubbling the olefinic hydrocarbon feedstock to be polymerized through the ionic liquid, or,
(ii by dispersing the ionic liquid in appropriate concentration into the olefinic hydrocarbon feedstock to be polymerized and then subjecting such a dispersion to polymerization.

In the case of (i), the rate at which the olefinic hydrocarbon feedstock is to be bubbled and in the case of (ii), the amount of ionic liquid mixed with the feedstock and, in both cases the reaction temperature used will depend upon the molecular weight of the product desired. Normally in this type of reaction one would expect that the higher the temperature used, the lower the molecular weight of the polymer formed.

It has now been found that, surprisingly, when the process (i) is used, the polymer product forms a separate layer and floats on the surface of the ionic liquid. This product layer is substantially free of any catalyst or ionic liquid contaminants. The polymer product can thus be readily removed from the ionic liquid surface e.g. by tapping. This feature has several advantages:
a. Ease of separation of the product polymer from the catalytic component means that further reaction of the olefinic end-group in the polymer, such as e.g. isomerization, is minimised thereby retaining the structure of the polymer formed. This means that such further undesirable reactions are avoided without resort to the use of conventional reaction quenching agents such as aqueous alkali.
b. The polymer product formed need not be water-washed because of the relatively low levels of the catalytic ionic liquid in the product thereby avoiding a process step.

If process (ii) is used, it may be necessary to add a quenchant such as aqueous ammonia in order to terminate the reaction and/or to neutralise any catalytic components. The products can then be water-washed and the product polymer separated. In this case, the unreacted material can be allowed to evaporate and the dried product isolated.

A feature of the present invention is that this method enables a much higher percentage of n-butenes to be incorporated in the product polymer than would be possible in conventional cationic polymerization processes using e.g. aluminium trichloride or boron trifluoride.

Yet another surprising feature of the present process is that contrary to expectations, the molecular weight of the product does not increase with decreasing temperatures. In spite of using reaction temperatures which are substantially higher than those used in the prior art, the present process gives rise to polymers which have a higher molecular weight than the oligomers formed by said prior art processes.

These surprising features give a very desirable outlet for relatively low value feedstocks such as raffinates I and II at the same time making maximum use of the reactive carbon values in that feedstock and hence reducing the wastage of any hydrocarbon values in such feedstock.

The polymer products produced by the process of the present invention can be used e.g. as lubricants or cutting fluids in the industry without further treatment. Alternatively, these polymers can be maleinised and converted to corresponding succinic anhydride derivatives which in turn can be converted into the corresponding imide which is a detergent for lube oils and fuels.

The present invention is further illustrated with reference to the following Examples:

EXAMPLE 1

An ionic liquid comprising 1-ethyl-3-methyl imidazolium chloride (10 g, 0.068 mol) and aluminium trichloride (18.22 g, 0.137 mol) was used. 25 g of raffinate I feedstock of an olefinic composition shown below was bubbled through 3 g of the ionic liquid over a period of 30 minutes. The reaction was exothermic but was not allowed to exceed 56° C. during this period. The polymer product formed a separate layer above the ionic liquid and the conversion achieved of the various components in the raffinate I feed is also shown below:

| Olefin | Raffinate I Feedstock | |
|---|---|---|
|  | % w/w Concn. | % w/w Reacted |
| Iso-butene | 46 | 91 |
| Butene-1 | 25 | 47 |
| Trans-butene-2 | 8.2 | 34 |
| Cis-butene-2 | 2.8 | 37 |

The yield of the polymer in terms of the total raffinate I feedstock introduced was 34% w/w at 56° C. and 56% w/w at 0° C.

EXAMPLE 2

The process of Example 1 was repeated using a substantially pure iso-butene as the feedstock. The following results were achieved at the reaction temperatures shown:

| Temp (°C.) | Yield (% w/w) | Mol Wt of Product |
|---|---|---|
| −23 | 26 | 100,000 polystyrene eqvt |
| 0 | 75 | 3000 & 400 (Bimodal) |

EXAMPLE 3

The olefinic composition of the raffinate II used in this Example was as follows:

| Raffinate II | |
|---|---|
| Hydrocarbon | % w/w Conc. |
| Iso-butene | 6 |
| Butene-1 | 35 |
| Cis-butene-2 | 6 |
| Trans-butene-2 | 20 |
| n-Butanes | 24 |
| Iso-butane | 8 |

A batch process was carried out in which raffinate 11 (146 g) was condensed into a flange flask fitted with dry-ice condenser, magnetic stirrer and thermocouple and placed in a dry-ice acetone bath. Under these conditions the contents of the flask were in the liquid state. The temperature of the liquid was allowed to rise to −4° C., and then the ionic liquid prepared as in Example 1 above (1 ml) was added. During the next 2.25 hours, the reaction temperature rose to +2° C. and after this time, aqueous ammonia (6n-d) was added to quench the reaction followed by water-washing of the crude oligomer product. The washings were separated in a funnel and the oligomer product run off and dried over anhydrous magnesium sulphate. Finally, the oligomer was filtered to remove any solids and stripped of any solvents to recover a colourless liquid (yield 93.4 g) which had a number average molecular weight of 620. The conversion based on the hydrocarbon content of the feedstock was 64% W/W, and the conversion based on the olefinic content of the feedstock was 94.1% w/w.

The above process was repeated using the same raffinate II but the method and catalyst used were as follows:

Comparative Test (not according to the invention)

A batch process was carried out in which raffinate II (120.9 g) was condensed into a flange flask fitted with dry-ice condenser, stirrer paddle and thermocouple and placed in a dry-ice acetone bath. Under these conditions the contents of the flask were in the liquid state. Co-catalyst, tertiary butyl chloride (0.63 g 6.8 mmol) was then added, and the temperature of the liquid was allowed to rise to −10° C. During a period of 20 minutes a solution of ethyl aluminium dichloride in hexane (1M, 6.5 ml, 6.5 mmol) was gradually added to the flask contents. After a further 10 minutes, ammonia gas was passed through the liquid reaction mixture to quench the reaction. The crude oligomer product was then collected in heptane, water-washed, and dried over anhydrous magnesium sulphate. Finally, the washed oligomer liquid was filtered to remove any solids and the filtrate stripped of solvent to recover a pale yellow liquid (yield 61.08 g) which had a number average molecular weight of 539.

The conversion in this Test was 50.52% w/w based on the total hydrocarbons in raffinate II feedstock and 75.4% w/w based on the olefinic content of the feedstock.

The above results prove the superiority of the present process.

We claim:

1. A process for the polymerization of an olefinic feed stock comprising one or more of butene-1, butene-2 and iso-butene, said process comprising bringing the feedstock into contact with an ionic liquid comprising
   a) an aluminium compound of the formula $R_nAlX_{3-n}$ wherein R is a C1–C6 alkyl radical, X is a halogen atom and n is 0, 1 or 2, and
   b) a substituted hydrocarbyl imidazolium and/or a substituted hydrocarbyl pyridinium halide such that the melting point of the ionic liquid is below the reaction temperature, said reaction temperature being in the range −50° C. to +100° C. to obtain a polymer product which as a molecular weight of at least 600.

2. A process according to claim 1 wherein the olefinic feedstock is a raffinate I or raffinate II feedstock.

3. A process according to claim 2 wherein the raffinate I feedstock comprises at least 10% w/w of iso-butene, from 20–40% w/w of butene-1 and butene-2, and from 10–20% w/w of butanes.

4. A process according to claim 2 wherein the raffinate II feedstock comprises from 30–35% w/w of butene-1, about 10% w/w of cis-butene-2, about 17% w/w of trans-butene-2, upto 6% w/w of iso-butene and upto 30% w/w of butanes.

5. A process according to claim 1 wherein the mole ratios of component (a) to component (b) in the ionic liquid is in the range from 1:1 to 2:1.

6. A process according to claim 1 wherein the polymerization is carried out either:
   (i) by bubbling the olefinic feedstock to be polymerized through the ionic liquid, or,
   (ii) by dispersing the ionic liquid in appropriate concentration into the the olefinic feedstock to be polymerized and then subjecting said dispersion to polymerization.

7. A process according to claim 1 wherein the polymerization reaction is carried out at a temperature in the range from −30° C. to +70° C.

8. A process according to claim 1 wherein component (a) of the ionic liquid comprises aluminium trichloride or an alkyl aluminium dichloride.

9. A process according to claim 1 wherein component (b) of the ionic liquid comprises one or more of the substituted imidazolium or pyridinium halides selected from the group consisting of:
   1-alkyl-3-alkyl-imidazolium halides,
   alkyl pyridinium halides and
   alkylene pyridinium halides.

* * * * *

UNITED STATES PATENT AND TRADEMARK OFFICE
CERTIFICATE OF CORRECTION

PATENT NO. : 5,304,615
DATED : April 19, 1994
INVENTOR(S) : Philip W. Ambler, Philip K.G. Hodgson and Nevin J. Stewart It is certified that error appears in the above-indentified patent and that said Letters Patent is hereby corrected as shown below:

Col. 3, l. 3, correct the spelling of "alkyl-imidazolium"

Col. 3, l. 9, should read "1-methyl-3-"

Col. 3, l. 23, the temperature range should read "-30°C. to +70°C.,"

Col. 5, l. 21, change "(6n-d)" to --(6ml)--

Claim 1, column 6, line 13, correct the spelling of the word "has"--.

Signed and Sealed this

Thirtieth Day of August, 1994

Attest:

BRUCE LEHMAN

Attesting Officer

Commissioner of Patents and Trademarks